Dec. 15, 1959   E. C. ST. GEORGE   2,916,977
IDENTIFICATION CAMERA
Filed Oct. 24, 1955   3 Sheets-Sheet 1
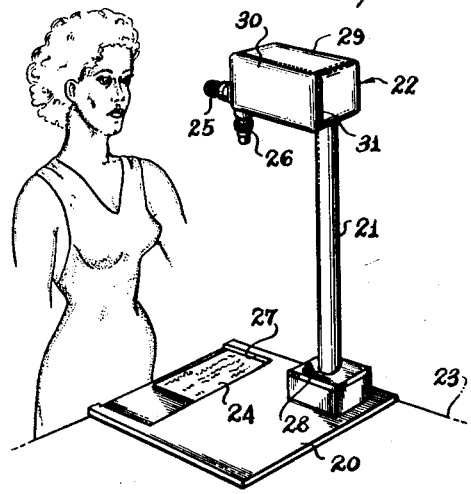
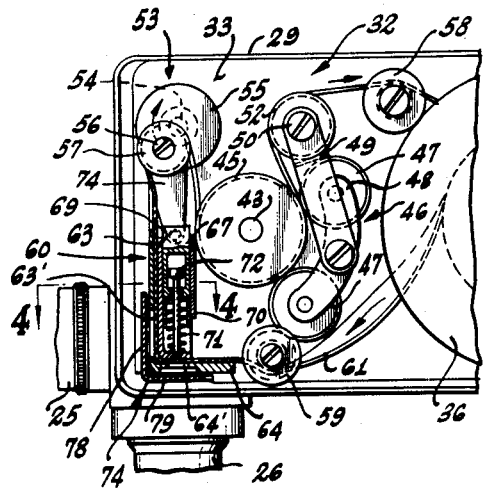
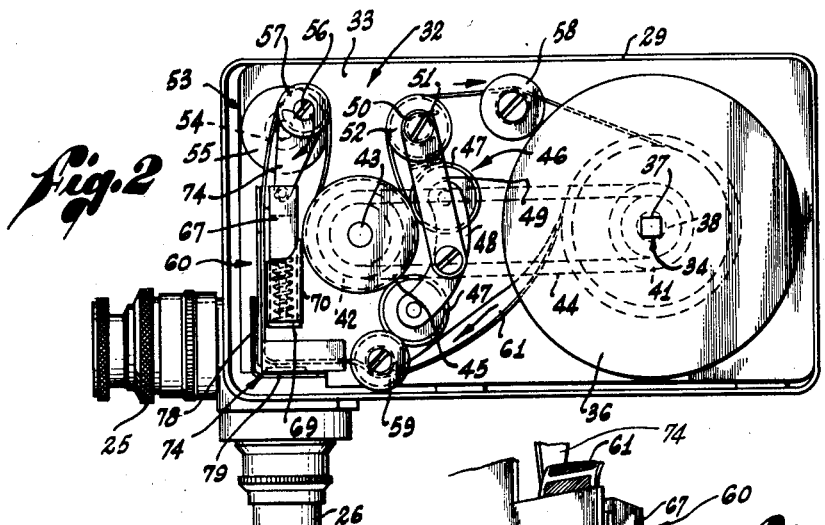
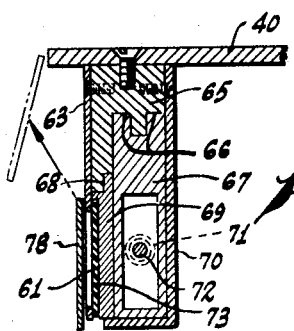
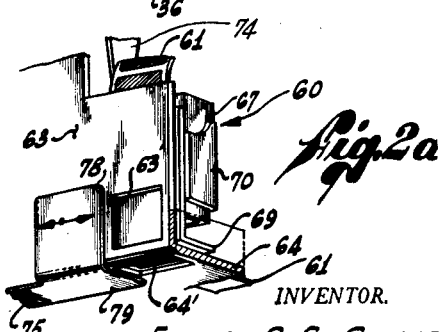
INVENTOR.
ERNEST C. ST. GEORGE
BY
ATTORNEY Dec. 15, 1959  E. C. ST. GEORGE  2,916,977
IDENTIFICATION CAMERA
Filed Oct. 24, 1955  3 Sheets-Sheet 2
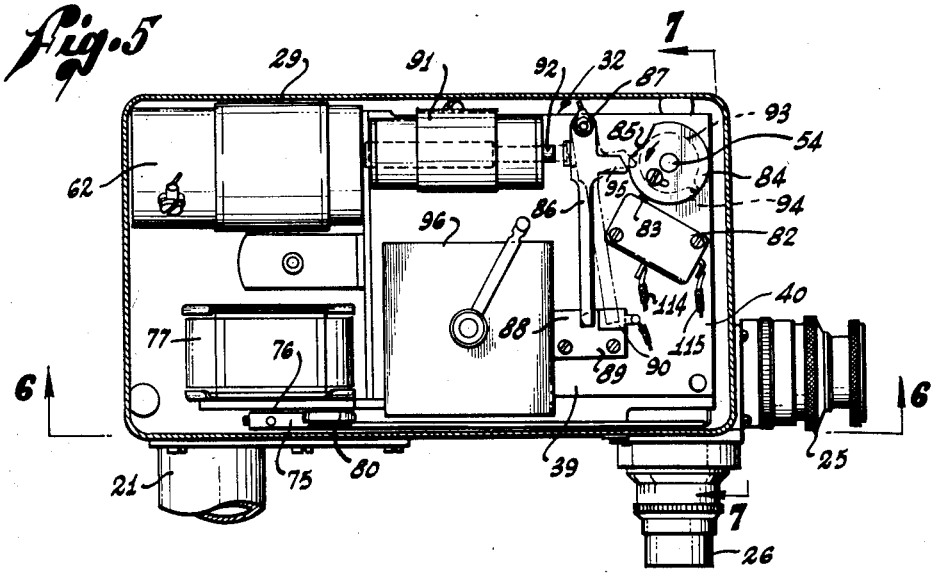
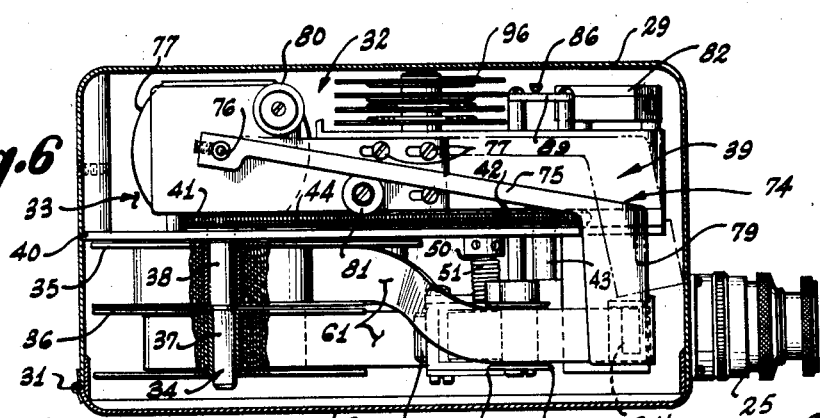
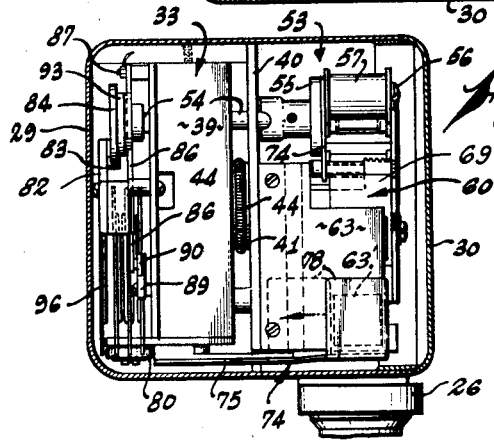
INVENTOR.
ERNEST C. ST. GEORGE
BY
ATTORNEY Dec. 15, 1959     E. C. ST. GEORGE     2,916,977
IDENTIFICATION CAMERA
Filed Oct. 24, 1955     3 Sheets-Sheet 3
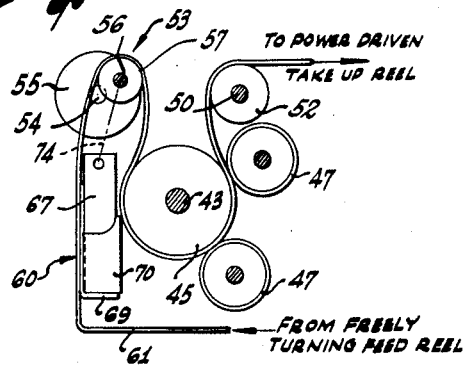
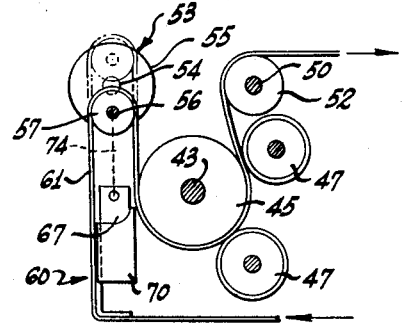
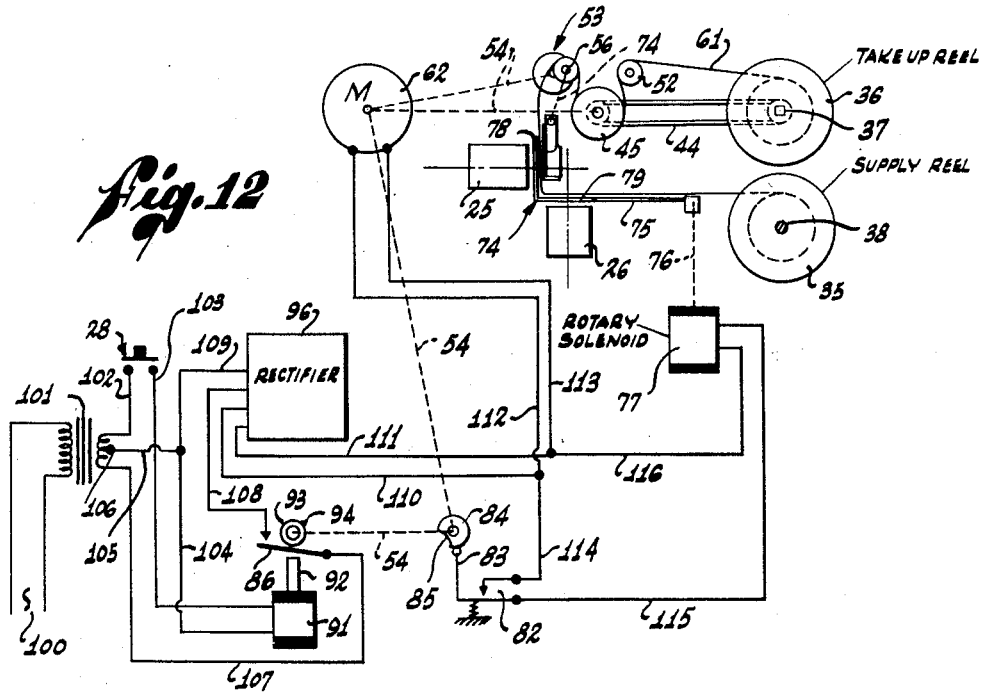
INVENTOR.
ERNEST C. ST. GEORGE
BY
ATTORNEY

United States Patent Office 2,916,977
Patented Dec. 15, 1959

2,916,977

IDENTIFICATION CAMERA

Ernest C. St. George, Hollywood, Calif., assignor to Kenneth D. Clardy, Hollywood, Calif.

Application October 24, 1955, Serial No. 542,346

16 Claims. (Cl. 95—18)

This invention relates generally to photographic apparatus and more particularly to a camera having a pair of angularly related optical axes and which is operative to simultaneously photograph objects disposed on both of said optical axes.

A primary illustrative application of the invention is concerned with the photographic recording, at a check cashing establishment, of a check to be cashed and the person cashing the same. It will become apparent from the ensuing description, however, that the invention is susceptible of adaptation to numerous other applications. For example, the camera constituting the illustrative embodiment of the invention has general utility as an identification camera for photographically identifying one object with another object. Thus, the camera might be employed to simultaneously photograph an identification form and the person to whom it is issued.

Referring again to the present illustrative application, various systems have been proposed for reducing the relatively large number of forged or otherwise worthless checks which are passed each year. One such system has involved the making of a photographic record of a check to be cashed and the person cashing it. While such a photographic system does not enable the actual detection of worthless checks before they are cashed, it has, in practice, proven to be a strong deterrent to persons attempting to cash such checks and has resulted in a very material reduction in the number of worthless checks which are passed in establishments employing such a system.

Existing cameras for use in systems of this nature generally employ a pair of lenses whose optical axes are disposed at right angles to one another and arranged so that one of the lenses forms an image of a check while the other of the lenses forms an image of the person cashing the check. To enable both of these images to be recorded on a single film strip, existing camera arrangements employ an optical reflecting system for reflecting the image formed by one of the lenses along an axis parallel to the optical axis of the other of the lenses. The portions of the film upon which these two images are projected are coplanarly disposed, the film being advanced after each exposure to bring succeeding portions of the film into operative relationship with the optical system.

Cameras of the character described which embody such optical reflecting systems are, however, costly to manufacture and assemble, owing primarily to the cost of fabrication and installation of the reflecting systems, require illumination of substantial intensity and frequent servicing to remove dust accumulating from the reflecting surfaces, and are excessively massive and bulky. Because of these deficiencies, check cashing cameras have not gained widespread usage.

In the light of these preliminary remarks, it may be stated as a primary object of this invention to provide a camera of the class described which avoids the above and other deficiencies of existing cameras.

Another object of the invention is the provision of a camera of the class described, which embodies a novel arrangement for simultaneously forming on a single film strip a pair of images directed along angularly related optical axes.

Yet another object of the invention is the provision of a camera of the class described which permits the simultaneous photographing of objects disposed on two angularly related optical axes without the necessity of employing an optical reflecting system.

A further object of the invention is the provision of a camera of the class described which incorporates a shutter and gate assembly of novel design by means of which images projected along two angularly related optical axes may be simultaneously recorded on adjacent portions of a single film strip.

A still further object of the invention is the provision of a camera of the class described embodying a shutter of novel design and improved means for actuating the shutter in proper coordination with automatic advancing of film through the camera.

And a still further object of the invention is the provision of a camera, for use in check cashing establishments, for simultaneously photographically recording a check and a person cashing the check, which camera is relatively simple in construction, easy to use, small in size, and relatively inexpensive to manufacture.

The foregoing and other objects of the invention are, in the illustrative embodiment thereof, attained through the provision of a gate assembly comprising a pair of normally disposed aperture plates and a platen, including a spring pressed film engaging pad, which is movable in a direction parallel to one of said aperture plates and normal to the other aperture plate. Film is fed between the platen assembly and the aperture plates and is formed thereby into a right angular configuration, the apertures in the plates being arranged to expose portions of the film at each side of the right angle bend in the latter. These apertures are arranged on and normal to the right angularly disposed optical axes of a pair of lenses for forming images, respectively, of a check and the person cashing the same. Thus, the images formed by these lenses are projected through the apertures onto the adjacent right angular portions of the film. The movable platen assembly is operated in coordination with the film advancing mechanism in such a manner that the film, during exposure thereof, is pressed into intimate contact with one of the aperture plates about the edges of its respective aperture, so as to assure a check image of high quality, and subsequently released and advanced to aline a succeeding portion thereof with said apertures. The platen assembly retains the film in proper relationship to the aperture in the other aperture plate so as to assure a high quality image of the person cashing the check.

A shutter of L-shaped configuration is arranged to cover both apertures and is actuated in coordination with the platen movement to simultaneously uncover both of said apertures during the period that the film is firmly clamped against said one aperture plate. An electrical control circuit embodied within the invention is operative, upon a momentary depression of an actuating switch, to effect sequential clamping of the film against said one aperture plate, actuation of the shutter, advancing of the film, and stopping of the mechanism of the camera at a position wherein it is conditioned for repetition of the cycle upon the next depression of the actuating switch.

The invention may be best understood from the following detailed description thereof taken in conjunction with the accompanying drawings wherein:

Fig. 1 is a perspective view of the present camera illustrating the latter in use;

Fig. 2 is an enlarged side elevation of the camera mechanism enclosed within the camera housing shown in Fig. 1; the parts of the mechanism being illustrated in their normal inoperative position;

Fig. 2a is an enlarged detail in perspective of the novel film gate and shutter assembly of the invention;

Fig. 3 is a partial detail view similar to Fig. 2 illustrating the camera mechanism in one condition of operation, parts being broken away for the sake of clarity;

Fig. 4 is an enlarged section taken along line 4—4 of Fig. 3;

Fig. 5 is an enlarged side elevation of the camera mechanism enclosed within the camera housing shown in Fig. 1, on the side thereof opposite to that illustrated in Fig. 2;

Fig. 6 is a section taken along line 6—6 of Fig. 5;

Fig. 7 is a section taken along line 7—7 of Fig. 5;

Figs. 8 and 9 are enlarged detail views illustrating the operation of film feed and shutter actuating switches embodied in the invention;

Figs. 10 and 11 are detail views illustrating the operation of the film feed mechanism; and Fig. 12 is a schematic showing of the electrical control circuit of the invention.

Referring now to these drawings, and more particularly to Fig. 1 thereof, the camera of this invention comprises a base plate 20 to which is rigidly fixed the lower end of a vertical supporting post 21 on the upper end of which is mounted the present camera 22. Base plate 20 is adapted to be supported on a counter 23 of a check cashing stand in front of which the person cashing a check 24 may stand while cashing the same.

Camera 22 includes a pair of lenses 25 and 26, the former of which has its optical axes horizontally disposed to form an image of the person cashing the check and the latter of which has its optical axis vertically disposed to form an image of the check 24. Base plate 20 may be formed with a recess 27 for receiving the check 24 so that the latter will be properly positioned on the optical axis of the lens 26. It is contemplated that the film used in the present camera will be sufficiently fast to permit photographing of the person and check without the necessity of illumination other than the natural and artificial light present in the average establishment. However, if desired, additional light sources, not shown, may be mounted on the camera. A control switch 28, which may be adapted for hand actuation, as shown, or for foot actuation, is provided for initiating the aforementioned film exposure—film advance cycle, as will be hereinafter more fully described.

Camera 22 will now be described in greater detail by reference to Figs. 3–12.

The present camera comprises a hollow, rectangular casing 29 fixed, with its longer dimension horizontal, to the top of post 21. Lenses 25 and 26 are, respectively, fixedly mounted on the forward and under side walls of the housing 29 adjacent the juncture of these walls, as illustrated. These walls are provided with openings, not shown, to permit the passage of light from the lenses into the housing. One side wall 30 of the housing 29 forms a removable closure which is hinged at 31 to the housing 29 for pivotal movement between the closed position illustrated and an open position to permit loading of film into the camera and servicing of the latter. Suitable latching means, not shown, may be provided for retaining the closure 30 in its closed position. Fixedly mounted within the housing 29 is the mechanism 32 of the present camera.

Referring now more particularly to Figs. 2, 3, 4, 6, 7, 10 and 11, the parts of the camera mechanism 32 on that side of a supporting structure 33 nearest the closure 30 and rendered visible by the opening of the closure, comprises a shaft 34 journaled in and projecting beyond the supporting structure 33. Mounted on the shaft 34, as shown more clearly in Fig. 6, are a film supply reel 35 and a film take-up reel 36. As shown, supply reel 35 is positioned adjacent supporting structure 33 while take-up reel 36 is positioned adjacent the outer extremity of shaft 34.

Shaft 34 is provided with an outer squared portion 37 engaging in correspondingly squared openings in the take-up reel 36 so that the latter is fixed against rotation on the shaft 34. The inner end portion of the shaft 34 is cylindrical in cross section, as indicated at 38, and is received in squared openings in the supply reel 35 so that the latter is mounted for free rotation on the shaft 34.

As shown most clearly in Figs. 6 and 7, supporting structure 33 comprises a hollow rectangular casing 39 which is rigidly fixed to the upper wall of housing 29 and has its side and bottom walls spaced, respectively, from the left hand side wall and bottom walls of housing 29, as viewed in Fig. 7. The structure 33 further comprises a plate 40 which is fixed in spaced, parallel relationship to the right hand side wall of the casing 39, as shown. Shaft 34 is journaled in the plate 40 and casing 39 so as to extend across the space between these parts, and mounted on the shaft 34 in this space is a pulley 41 around which and a second pulley 42, fixed on a shaft 43 journaled in casing 39 and plate 40 and extending beyond the latter in spaced, parallel relationship to shaft 34, is a spring drive belt 44 so that shafts 34 and 43 and take-up reel 36 are connected for simultaneous rotation thereof.

Fixedly mounted on the portion of shaft 43 which projects beyond the supporting plate 40 is a film feed pulley 45 (Fig. 2). Indicated at 46 is conventional structure for maintaining a film strip in frictional engagement with the feed pulley 45, which structure comprises a pair of friction rollers 47 journaled at their opposite ends in the extremities of a pair of arcuate members 48, only one of which is shown. Arcuate members 48 are pivotally connected at their centers to one end of a pair of links 49, only one of which is illustrated, the other ends of which links are pivotally mounted on a headed pin 50 fixed at one end in supporting plate 40. Spring means 51 are provided for urging the free ends of links 49 toward the shaft 43 so that the rollers 47 will be resiliently urged into contact with the feed roller 45. Also rotatably mounted on the pin 50 is a first idler pulley 52.

Cooperating with the feed pulley 45 to feed film through the camera is a beater mechanism 53 including a shaft 54 journaled in the supporting structure 33 and rigidly mounting on the end portion thereof which projects beyond the supporting plate 40 a disk 55 on which is journaled, in eccentric relationship to the shaft 54, as by a pin 56, a pulley 57. Indicated at 58 and 59 are, respectively, second and third idler pulleys, and indicated at 60 is the novel gate and shutter assembly of this invention, to be hereinafter more fully described, which retains adjacent portions of a film strip on and normal to the optical axes of lenses 25 and 26.

A film strip 61 is threaded through the present camera, in the manner illustrated in Fig. 2, from the supply reel 35, around the idler pulley 59, through the gate assembly 60, over the eccentric beater pulley 57, around the feed pulley 45 between the latter and friction rollers 47, over the idler pulleys 52 and 58, to the take-up reel 36.

The above described elements are driven by a motor 62, Fig. 5, fixedly mounted on the supporting structure 33 on the side thereof opposite closure 30. The driving shaft, not shown, of motor 62 is drivably connected through gearing, not shown, enclosed within the hollow, rectangular casing 39, to shafts 43 and 54 so that the latter and the take-up reel 36 will be driven whenever the motor 62 is energized, the take-up reel being driven from shaft 43 through the belt drive 44.

An electrical control circuit for the motor 62, to be hereinafter more fully described with reference to Fig. 12, is operative, upon each actuation of the control switch 28, to rotate the beater assembly pulley 57 in the direction indicated from its normal position, shown in Fig. 2, one revolution and return the latter to said normal position and to continuously rotate the film feed pulley 45, in the direction indicated, during this single rotation of the beater pulley. The arrangement is such that the slack produced in the film strip 61 during initial downward movement of the beater pulley 57 (see Fig. 10) to its lower dead center position (Fig. 11) is taken up by rotation of the film feed pulley 45 so that upon subsequent upward movement of the beater pulley 57 to its normal position in Fig. 2, a predetermined length of film will be drawn through the shutter and gate assembly 60 will be drawn through the shutter and gate assembly 60 will be drawn through the shutter and gate assembly 60 the optical axes of the lens 25 and 26. During this feeding of the film, the take-up reel 36 will be continuously rotated, as heretofore mentioned, to rewind the film strip 61.

Referring now more particularly to Figs. 2, 2a, 3, 6 and 7, the gate and shutter assembly 60, which constitutes a highly essential and novel part of this invention, comprises a generally L-shaped film guide made up of a pair of right angularly disposed aperture plates 63 and 64 rigidly fixed to a guide block 65 (Fig. 4), the latter in turn being rigidly fixed to the supporting plate 40, Fig. 4. The aperture plates 63 and 64, which form the two right angle legs of the film guide, are positioned, respectively, normal to the optical axes of lenses 25 and 26. The apertures 63' and 64' in the aperture plates 63 and 64 are positioned on the optical axes of the respective lenses 25 and 26 so that the images formed by the latter may be projected through the apertures.

Guide block 65 is formed with a guideway 66 extending parallel to aperture plate 63 for receiving a movable platen assembly 67, and with a second guideway 68, also extending parallel to aperture plate 63, for receiving a pressure plate 69 of generally L-shaped configuration, as shown more clearly in Figs. 2, 2a, and 3. A flanged retaining member 70 has one flange secured to the guide block 65 and has its other flange overlying the platen assembly 67 and pressure plate 69 to retain the latter in the guideways 66 and 68. As shown most clearly in Fig. 3, a coil compression spring 71 bears at one end against the lower end surface of the platen 67 and at its other end against the upper face of the pressure plate 69 so as to bias the latter away from the platen 67 and toward the aperture plate 64. A headed retaining pin 72 fixed to the pressure plate and movable in a bore in the platen 67 serves to limit outward movement of the pressure plate.

As shown more clearly in Fig. 4, the vertically disposed leg of the pressure plate 69 is recessed at 73 for receiving the film strip 61, the clearance between the bottom of the recess 73 and the aperture plate 63 being substantially equal to the thickness of the film strip so that the latter will be retained in close contact with the aperture plate 63 about the edges of its aperture 63'. Platen 67 and pressure plate 69 are adapted for movement toward the aperture plate 64 to clamp the film strip 61 thereagainst, and to this end the upper end of the platen 67 is connected by a crank arm 74 to the eccentric pin 56 mounting the beater pulley 57. Thus, during the aforementioned single rotation of the beater pulley to feed the film, following each actuation of the switch 28, platen 67 and pressure plate 69 will be removed from their retracted positions, shown in Fig. 2, to a position wherein the pressure plate 59 firmly presses the film strip 61 against the aperture plate 64, the platen and pressure plate being returned to their normal retracted position upon return of the beater pulley to its normal position.

The arrangement of the parts is such, that in the lowermost position of the platen 67, spring 71 will be somewhat compressed so that for a limited portion of the stroke of the beater pulley on opposite sides of its lower dead center position, the pressure plate will be maintained in contact with the aperture plate 64.

From the foregoing description of the gate assembly 60, it will be seen that the film strip 61, which is fed between the right angular portions of the pressure plate 69 and the aperture plates 63 and 64, will be formed thereby into a right angular configuration with the portions of the film adjacent the right angular bend therein positioned behind the apertures 63' and 64' so as to have the images formed by the lenses 25 and 26 projected thereon.

Indicated at 74 is a shutter for controlling the exposure of the film strip 61 through the apertures 63' and 64'. Shutter 74 comprises an arm 75 fixed at one end to the shaft 76 of a rotary solenoid 77 fixedly mounted to the bottom wall of casing 39 as by means 77'. Shutter 74 is provided at its free end with a pair of right angularly disposed shutter plates 78 and 79, which, in the normal position of the shutter 74, shown in solid lines in Fig. 6, overlie, respectively, the apertures 63' and 64' in the apertures plates 63 and 64 so as to preclude the passage of light from the lenses 25 and 26 to film strip 61 behind the apertures. The pivotal axis of shutter 74 is normal to the plane of aperture plate 64, the arrangement being such that when the rotary solenoid 77 is energized by operation of the hereinafter described electrical control system, the shutter is moved from its full line position in Fig. 6 to its dotted line position with the resultant simultaneous uncovering of the apertures 63' and 64' by the shutter plates 78 and 79 to expose the film strip 61. In its retracted position, the shutter arm 75 abuts a resilient limiting stop 80 while in its normal position, the shutter arm 75 abuts a second resilient limiting stop 81.

Shutter actuation is controlled by a normally closed microswitch 82, Fig. 5, whose actuating plunger 83 is retained in an open position by bearing against the circular periphery of a control cam 84 fixedly mounted on the inner end of shaft 54 which shaft, at its other end, mounts the crank arm 74 for moving the platen 67 to and from its aforedescribed clamping position. Cam disk 84 has a portion of its periphery cut away, as indicated at 85, the arrangement being such that when the cam disk 84 is rotated to aline its cut away portion 85 with the microswitch plunger 83, the microswitch 82 will be permitted to momentarily close so as to energize the rotary solenoid 77 and retract the shutter 74. Control of the film motor 62 is exercised by a switching arrangement comprising a switch 86, Figs. 5, 8 and 9, which is pivoted at one end at 87 to the supporting structure 33 for pivotal movement of its free end between a position, indicated in solid lines in Fig. 5, and in Fig. 9, wherein said free end bears on an insulated portion 88 of a contact plate 89, and a closed position, shown in phantom lines in Fig. 5 and in Fig. 8, wherein said free end bears on a conductive strip 90 of the contact plate 89. In its closed position, switch arm 86 completes a circuit from an A.C. source, to presently be described, to the drive motor 62, whereupon the latter will operate to feed film through the camera in a manner previously described. Normally switch arm 86 will be in its open position, and will, upon actuation of the manual switch 28 be shifted to its closed position by operation of a solenoid 91 whose normally retracted plunger 92, is, upon energization of the solenoid 91, extended into engagement with the switch arm 86 to shift the latter to said closed position. Reopening of the switch arm 86 is accomplished by a second cam disk 93 fixed on the shaft 54. This second cam disk 93 includes at one point on its periphery, a projection 94 which, after the shaft 54 has been rotated through one revolution by the motor 62, will engage an extension 95 on the switch arm 86 to shift the latter to its open position. Indicated at 96, Fig. 5, is a rectifier included in the electrical system of the camera, which system will now be described with reference to Fig. 12.

Electrical power for operating the present camera is received from an A.C. source 100 connected across the primary terminals of a step-down transformer 101. One terminal of the manual control switch 28 is connected through a lead 102 to one terminal of the secondary winding of transformer 101 while the other contact of switch 28 is connected through lead 103 to one terminal of the motor switch solenoid 91. The other terminal of the solenoid 91 is connected through leads 104 and 105 to a center tap 106 on the transformer secondary winding so that closing of switch 28 results in energizing of the solenoid 91 and extension of its plunger 92 to swing switch arm 86 to its closed position. Closure of switch arm 86 completes a circuit from the other terminal of the transformer secondary winding through a lead 107 to one input lead 108 of the rectifier 96, the other input lead 109 of which is connected through lead 105 to the transformer secondary winding center tap 106.

Rectifier 96 is thus supplied with an alternating input from the supply 100 which is converted to a D.C. current in output leads 110 and 111 of the rectifier. Rectifier output lead 110 is connected through a lead 112 to one terminal of film feed motor 62 while rectifier output lead 111 is connected through a lead 113 to the other terminal of motor 62. Motor 62 will thus be energized to drive take-up reel 36, film feed pulley 45, beater assembly 53, and cam disks 84 and 93.

Initial downward movement as viewed in the drawings, of the eccentric pin 56 of the beater assembly, during rotation of the latter, produces, through the crank arm 74, downward movement of clamp plate 69 to clamp film strip 61 against aperture plate 64, Fig. 2. The angular position of recess 85 in shutter control cam disk 84 relative to that of eccentric pin 56 is made such that said recess will be rotated into alinement with plunger 83 of microswitch 82 just prior to passage of said pin through its lower dead center position. While the eccentric pin is in such position, the pressure plate biasing spring 71 will, as heretofore described, be compressed so that the momentary closing of the switch 82 and resultant retraction of shutter 74 will occur while the film strip 61 is firmly clamped against the aperture plate 64. Closure of microswitch 82 completes a circuit from rectifier input lead 110 through leads 114 and 115, rotary solenoid 77, a lead 116 to the other output lead 111 of the rectifier to energize the solenoid and thus retract the shutter 74 to permit photographic recording of the check 24 and person cashing the same.

Continued operation of motor 62 will result in release and advancing of the film strip 61 past the apertures 63' and 64', in the manner heretofore described, to position succeeding portions of the film strip behind said apertures. Motor 62 will continue to drive until projection 94 on cam disk 93 is rotated to a position wherein it engages extension 95 (Fig. 5) on switch arm 86 to move the latter to its open position and thus break the circuit between rectifier 96 and the A.C. supply 100. The parts will come to rest in a position wherein the camera is conditioned to repeat the above described cycle upon the next actuation of the manual switch 28.

From the above described arrangement, it will be apparent that there has been provided a camera which is operative to photograph objects disposed on two angularly related optical axes on a single film strip without the aid of an optical reflecting system so as to be fully capable of attaining the objects and advantages preliminarily set forth.

While a preferred embodiment of the invention has been heretofore described and illustrated, it is to be understood that it is merely illustrative in nature and that numerous modifications in design, instrumentalities, and arrangement of parts may be made without departing from the scope of the following claims.

I claim:
1. A camera comprising: a pair of lenses arranged with their optical axes relatively angulated for forming a pair of images of objects disposed in two angularly related planes, a pair of aperture plates each disposed normal to one of said axes and having its aperture on the respective axis and disposed to have the corresponding one of said images focused substantially in the plane thereof, film clamping means movable toward and away from one of said aperture plates on the side thereof opposite the corresponding lens and spaced from the other aperture plate a distance substantially equal to the thickness of a film strip, said film clamping means including a spring pressed plate movable into and out of resilient clamping engagement with said one aperture plate by said movement of the clamping means, said aperture plates and clamping means being adapted to have a film strip positioned therebetween whereby said images may be photographically recorded on the portions of the film exposed through said apertures, means for feeding the film strip through the camera whereby to aline successive portions of the strip with said apertures, shutter means for controlling the exposure of the film, and means for operating said shutter means and film clamping means in coordination with said film feeding means whereby the film is first resiliently clamped against said one aperture plate by said spring pressed plate, the shutter momentarily retracted to expose the film, and the film released for advancing thereof by said film feeding means.

2. In combination in a camera, film guiding means comprising a pair of angularly related aperture plates each having an aperture through which an image is adapted to be projected onto a film strip behind said plates, film clamping means movable toward and away from one of said plates for firmly and releasably clamping the film thereagainst about the periphery of the corresponding aperture, the film clamping means being spaced from the other plate a distance substantially equal to the thickness of the film strip whereby the latter will be retained in close contact with said other aperture plate.

3. The subject matter of claim 2 wherein said film clamping means includes a spring pressed plate whereby said film may be resiliently clamped against said one aperture plate.

4. The subject matter of claim 2 including shutter means normally covering both of said apertures, means for operating said clamping means to first clamp and then release the film, and means for actuating said shutter means in coordination with said film clamping means whereby the shutter means is retracted to expose said apertures while the film is clamped against said one aperture plate.

5. The subject matter of claim 2 including means for feeding the film strip through said film guiding means to aline successive portions of the film strip with said apertures, said film feeding means including manually operable control means and being arranged to cause advancing of the film a predetermined distance in response to each operation of said manually operable control means, and means operatively connecting said film clamping means with the film feeding means whereby upon each operation of said manually operable means the film will be clamped against said one aperture plate, released, and then advanced said predetermined distance.

6. The subject matter of claim 5 wherein said film feeding means includes a rotary shaft, and said means operatively connecting the film feeding means and clamping means comprises crank means connecting said shaft and clamping means, shutter means normally covering the apertures in said plates, means for actuating the shutter means and clamping means in coordination comprising cam controlled switch means including a cam on said shaft, and said manually operable control means comprising normally open switch means including a pivoted switch arm, solenoid means for moving said switch arm to closed position upon each operation of said manually operable means, and cam means on said shaft for returning said switch arm to open position when said film has been advanced said predetermined distance.

7. A gate assembly for a camera of the class described, comprising a pair of angularly related aperture plates, and means positioned behind said plates and defining therewith a guideway for receiving a film strip and for retaining the latter with adjacent portions thereof angulated and in substantial parallelism with the adjacent plate, the aperture in each plate being arranged to expose the adjacent angulated portion of the film strip, said means comprising film clamping means movable parallel to one of said plates and toward and away from the other of said plates for clamping the film strip against said other plate, said clamping means being spaced from said one plate a distance substantially equal to the thickness of said film strip.

8. The subject matter of claim 7 wherein said clamping means includes spring pressed plate means between which and said other plate the film strip is clamped.

9. A camera for simultaneously photographing a check and the person cashing the same, comprising: a horizontal base adapted to have a check placed thereon, a camera supported above said base and including a first lens arranged with its optical axis in a vertical plane for producing an image of said checks; a second lens arranged with its optical axis in a horizontal plane for producing an image of the person cashing the check; means for positioning film on and normal to each of said axes whereby said images may be focused thereon, comprising a pair of aperture plates, each having its aperture on one of said axes for projection of said images therethrough, and film clamping means cooperating with said aperture plates to define a film guideway having right angular portions for receiving a film strip and for retaining adjacent portions of the strip on and normal to said axes, said clamping means being movable parallel to one of said plates and toward and away from the other plate to releasably clamp the film against the latter plate about the periphery of its aperture; means for feeding the film through said guideway to position successive portions of the film on said axes; shutter mechanism for controlling the passage of light from said lenses to the film; and means for moving said film clamping means in coordination with said film feeding means and shutter mechanism.

10. In a camera for simultaneously photographhng objects located in mutually perpendicular planes, a case, a pair of lenses on the case for forming images of objects located in said planes, said lenses being arranged with their optical axes substantially coplanar and extending substantially normal to one another, a film gate assembly in the case for receiving a film strip and locating adjacent portions thereof to have said images focused thereon, said gate assembly including a generally L-shaped film guide rigid on said case and having one leg on and substantially normal to the axis of one of said lenses approximately at the principal focus of the latter for positioning one of said film strip portions on and normal to the axis of said one lens at said focus thereof, the other leg of said film guide being located on and substantially normal to the axis of the other lens approximately at the principal focus of the latter for positioning the other of said film strip portions on and normal to the axis of said other lens at the principal focus thereof, means for holding said film strip portions against said legs of the film guide, and shutter means for controlling the passage of light from the lenses to a film strip in said gate assembly.

11. The subject matter of claim 10 wherein said film guide comprises a pair of substantially perpendicular aperture plates in the case located in planes substantially normal to and having their apertures on said axes respectively, and said second to the last-mentioned means comprises means at and spaced slightly from the sides of said aperture plates remote from the lenses and defining with said sides a generally L-shaped film track for receiving the film strip.

12. A camera comprising: a pair of optical means having angularly related optical axes for forming a pair of images of objects disposed in angularly related planes; film guiding means for positioning adjacent portions of a film strip on and substantially normal to said axes for projection of each of said images on one of said portions, comprising a pair of angularly disposed aperture plates, each having an aperture located to expose one of said film portions, clamp means for releasably pressing the film into intimate contact with one of said aperture plates about the periphery of the aperture therein, and means for maintaining the film in contact with the other aperture plate; means for feeding the film past the aperture plates when released by said clamp means to align successive portions of the film with said apertures; and shutter means removably disposed between said film guiding means and optical means.

13. The subject matter of claim 12 including means for actuating said shutter means to expose the film strip in response to clamping of the strip against said one aperture plate by said clamp means.

14. The subject matter of claim 12 including means for operating said shutter means and film clamping means in coordination with said film feeding means whereby the film is first clamped against said one aperture plate, the shutter means momentarily retracted to expose the film, and the film released for advancing thereof by said film feeding means.

15. The subject matter of claim 14 wherein said operating means includes crank means driven by said film feeding means for moving said film clamping means to and from its clamping position, and means operated by said crank means for actuating said shutter means while the film is clamped against said one aperture plate by said clamp means.

16. The subject matter of claim 15 wherein said shutter means comprises a pivoted arm including a pair of angulated shutter plates each normally overlying one of said apertures whereby to prevent the passage of light to the film therebehind, and said shutter actuating means comprises solenoid means for pivoting the arm to retract the shutter plates from their normal positions whereby to expose said apertures, and switch means operated by said crank means for controlling the energization of said solenoid means.

References Cited in the file of this patent

UNITED STATES PATENTS

| | | |
|---|---|---|
| 912,365 | Crudge | Feb. 16, 1909 |
| 1,117,637 | Colordeau | Nov. 17, 1914 |
| 1,645,590 | Ernst | Oct. 18, 1927 |
| 2,211,714 | Buckham | Aug. 13, 1940 |
| 2,347,749 | Monroe | May 2, 1944 |
| 2,674,931 | Mihalyi | Apr. 13, 1954 |
| 2,721,497 | Warren | Oct. 25, 1955 |